Figure 3:
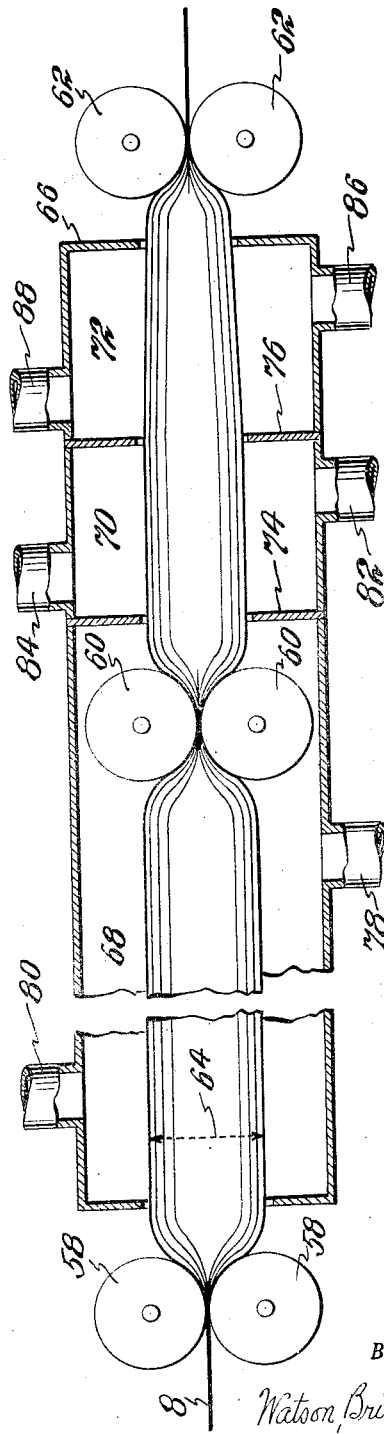

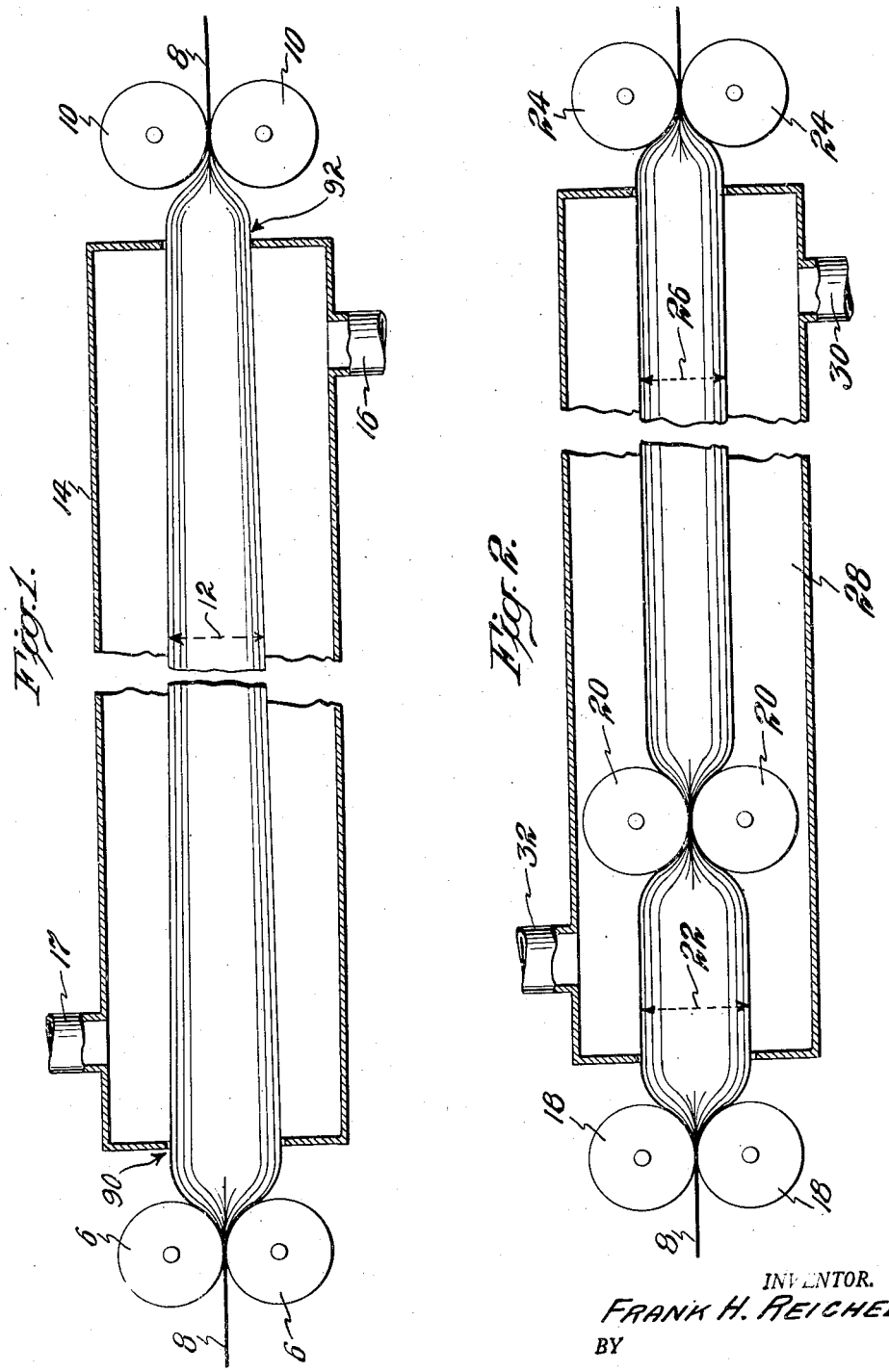

Dec. 27, 1949 F. H. REICHEL 2,492,440
APPARATUS FOR THE PRODUCTION OF ARTIFICIAL CASINGS
Original Filed June 24, 1941 2 Sheets-Sheet 2

INVENTOR.
FRANK H. REICHEL
BY
Watson, Bristol, Johnson & Leavenworth
ATTORNEYS

Patented Dec. 27, 1949

2,492,440

UNITED STATES PATENT OFFICE 2,492,440

APPARATUS FOR THE PRODUCTION OF ARTIFICIAL CASINGS

Frank H. Reichel, Fredericksburg, Va., assignor, by mesne assignments, to American Viscose Corporation, Wilmington, Del., a corporation of Delaware Original application June 24, 1941, Serial No. 399,560. Divided and this application June 7, 1946, Serial No. 675,169

3 Claims. (Cl. 18—15)

1

The invention relates to a process for producing flexible tubing for use as a container for stuffed products and to an apparatus therefor.

Artificial sausage casings as heretofore made of cellulose hydrate are characterized by shrinking a substantial amount while drying from a water-wet condition to an air-dry condition whereby the casing adheres closely to the encased food product and maintains the food product in a compacted condition and thereby presents an attractive appearance at all times. In order to preserve the high shrinkage characteristics of such cellulose hydrate casings, it has been thought necessary heretofore to cause these casings to be stretched a substantial amount during stuffing by the stuffing pressure. The cellulose hydrate casings have therefore, usually been furnished to meat packers in a dry, plasticized condition and having a size so selected as to cause the casing, even after being wet with water, to have a wet size considerably below the size to which the casing will be expanded during stuffing.

A conventional prior procedure to control the size of casings furnished to meat packers has been to suitably dry the casing to a definite dry size. When such prior casings were received by the packer, he would wet them in water, and while in the wet condition, a casing would be slipped or shirred over the stuffing horn of a stuffing machine and the meat or other food product would be forced into the casing to fill and also to expand the casing to the size desired by the packer. The expansion of the casing to the desired size by the food product required relatively high pressure, which was conducive to fatigue on the part of the stuffing machine operator who was required to hold the casing tightly around the stuffing horn and against the pressure exerted by the food product. It was also necessary for the stuffer to exercise considerable skill while the casing was being expanded such a large amount to estimate when the casing was expanded to the proper size and to stuff the casing so that it was expanded to a substantially uniform size along its length. It was frequently impossible to obtain a uniform size along the length of the stuffed casing because of inevitable variations in the stuffing pressures due to manual control of the stuffing machine and

2 because of slight variations in the wall strength of the casing being amplified in their effect by the high stuffing pressure. The above mentioned characteristics of prior casings greatly reduced the speed of production of the stuffed products. Moreover, the finished product was frequently unsightly because of variation in size and shape along the casing, particularly at the ends of the sausage or the like, in spite of all of the care that could be exercised by the machine operator, and considerable loss occasionally resulted due to bursting of the casings which had not been previously tested.

Casings, such as artificial sausage casings, are frequently provided with printing for the purpose of identifying the stuffed product and its manufacturer and the printed matter frequently includes designs, trade-marks and the like. Since such casings are usually printed while in a substantially dry state, the printing on the finished product is usually distorted because of the high degree of expansion which the casing undergoes during stuffing. Attempts have been made to compensate for this distortion by varying the shape of the indicia and/or configurations at the time of printing so that the same would assume a normal shape after stuffing. This has not been satisfactory due to inability to accurately shape the indicia and/or configurations so that they would assume normal shapes after stuffing and dilution of the color and/or opacity of the printing caused by stretching of the casing.

It is a general object of the present invention to provide a tubing, more particularly a sausage casing, which will overcome all of the foregoing difficulties.

Another general object is to provide a process of making tubing, more particularly sausage casing, which can be stuffed under a relatively low pressure.

A more specific object of the invention is to provide a tubing, more particularly a casing for stuffed products, which will require only a relatively slight expansion under the filling pressure during stuffing.

It is also an object of the present invention to provide a tubing, more particularly a casing, which has been tested to a pressure in excess of the pressure which will be reached during stuffing.

It is another object of the present invention to provide a process for stuffing products in casings under a relatively low pressure.

It is a more specific object of the present invention to provide a process of making a stuffed sausage utilizing a casing which can be stuffed under relatively low pressure and which will require relatively slight expansion during stuffing.

It is another more specific object of the present invention to provide a tubing, more particularly a casing for stuffed products, which can be stuffed dry by pouring the stuffing material into the casing without expanding the casing.

It is still a further specific object of the present invention to provide a process of producing printed tubing more particularly casings for stuffed food products, which can be printed in regular manner with no allowance for distortion and which can be used to produce finished stuffed products on which the printing will not be distorted.

Other objects and advantages, if not specifically pointed out, will be apparent to those skilled in the art from the following detailed description of what are now considered the preferred embodiments of the invention.

The process of the present invention in general comprises expanding by application of an internal pressure a tubing formed of a film-forming, non-fibrous, shrinkable material, in particular a film-forming cellulosic material, while in a wet state to a predetermined diameter which is at least equal to or preferably greater than the diameter to which the casing will be expanded later during stuffing with the usual apparatus and in accordance with usual stuffing operations. By expanding the casing in the wet state to a diameter greater than that to which the casing will be expanded during stuffing, the casing will be tested during manufacture and thereby the possibility of failure during stuffing will be decreased. The tubing is then dried while maintained in an expanded state and following the drying it is cut in any suitable manner into the desired lengths for stuffing. When the lengths of the tubing are to be stuffed they are placed in a suitable wetting agent, for example water for sufficient time prior to stuffing to permit them to become thoroughly wet. During the wetting operation, the tubing assumes the proper size for stuffing and when the stuffing operator thereafter stuffs the food product into the casing it will be necessary for the stuffing machine to exert sufficient pressure only on the stuffing material to pack the material firmly within the casing and expand the casing the small amount required for the elasticity of the casing to maintain the stuffed product in proper shape free from bulges and wrinkles. This low pressure will also expand the casing the easily controlled amount necessary to bring the casing to the desired stuffed size.

The term "wet state" as used throughout this specification and the claims means a state in which the tubing contains sufficient moisture to enable it to be stretched by the application of an internal pressure. The wet state may be due to the tubing never having been dried following formation or may be obtained by rewetting a tubing which has been previously dried. The rewetting may be accomplished by merely soaking the tubing in a liquid which wets the tubing material. For example, when the tubing material is cellulose hydrate the tubing may be merely soaked in water and thereby wet sufficiently to be stretched or, if desired, the tubing may be soaked in a substance which brings about a more pronounced swelling and softening, for example a zinc chloride solution or some other well known softening agent for cellulose hydrate.

When the casing is stuffed dry, the wet stuffing material is merely poured into a casing, having the lower end suitably closed, from a suitable vessel or nozzle until the casing is filled with the proper quantity of material. The open end of the casing is then closed as by tying, clipping or the like in known manner and the filled casing is set aside or hung up for a brief period. The moisture in the stuffing material quickly wets the casing and causes it to shrink and tightly encase the stuffing material.

Following the stuffing operations, the stuffed food product is suitably processed in known manner to cook, cure and otherwise finish the stuffed product.

The invention accordingly comprises the several steps and relation of one or more of such steps with respect to each of the others, and the article possessing the features, properties and the relation of elements, which are exemplified in the following detailed disclosure, and the scope of the invention will be indicated in the claims.

For a more detailed description of the invention reference is made to the following specification taken in connection with the accompanying drawings; in which, Fig. 1 diagrammatically illustrates one form of apparatus capable of use to carry out the process of the present invention;

Fig. 2 diagrammatically illustrates an apparatus capable of carrying out a modification of the process; and Fig. 3 diagrammatically illustrates an apparatus capable of carrying out another modification of the process.

The film-forming, non-fibrous, shrinkable materials as a group may be employed in making the tubing used in the practice of the present invention and the following examples are given only by way of illustrating some members of this group which have been found most suitable: hydrophillic colloids such as cellulose hydrate, alkali-soluble cellulose ethers, gelatine, casein and the like; also synthetic resins, cellulose ethers, cellulose esters, cellulose ether-esters, cellulose mixed esters and the like and mixtures of these substances. The cellulose hydrate can be produced by regeneration from viscose, by the deesterification of cellulose esters or by coagulation of cellulose from its solutions in organic and inorganic solvents such, for example, as tetra-alkyl ammonium hydroxides, zinc chloride, alkali metal perchlorates, sulfuric acid and the like. Because of its superior strength, there is preferably employed tubing comprising cellulose hydrate obtained by the denitration of nitrocellulose, the expansion treatment hereinafter described being carried out after the denitration of the tubing and while it is in a wet state. When the tubing is made from viscose, the expansion thereof, according to this invention, is carried out after the regeneration of the cellulose hydrate, but while it is in the wet state.

It is to be understood that all expansion of the casing according to the present invention is independent of and distinct from any stretching to which the casing may have been subjected prior to denitration or prior to regeneration as the case may be, for example, as disclosed in United States Patent No. 2,176,925. Any stretching of the tubing which is carried out before denitration or regeneration does not accomplish the novel results produced by expanding the tubing after denitration or regeneration in accordance with the present invention.

The tubing may be plasticized in any desired manner, as, for example, by passing the tubing continuously through a bath containing a suitable plasticizing solution. Suitable plasticizers are determined by the material of the tubing and plasticizers for all of the tubing material substances heretofore named are well known to those skilled in the art. When the tubing is formed of a cellulosic material for example cellulose hydrate, the plasticizer may be an aqueous solution of glycerine, a glycol, sorbitol or the like.

The tubing which is to be expanded in accordance with the present invention may be produced in any well known manner, but preferably the tubing is produced as described in said United States Patent No. 2,176,925.

One form of apparatus capable of use in carrying out the process of the present invention is illustrated in Fig. 1 and comprises a pair of positively driven pinch rollers 6—6 which are suitably urged toward each other under adjustable pressure exerted by a suitable mechanism actuated by weighted levers, springs and the like in well known manner to seal the tubing passing therethrough. The tubing 8 after passing between the pinch rollers 6—6 is passed through a suitable drier housing, having a port of entry 90 and of exit 92 of greater diameter than the port of exit 92 and then between a second pair of positively driven pinch rollers 10—10 spaced some distance, for example 10 to 150 feet, from the rollers 6—6 and are also urged together under a suitable pressure in the same or similar manner as the pinch rollers 6—6 so as to seal the tubing passing therethrough. The sets of pinch rollers are provided with suitable devices of known type to raise the upper roller of either pair to permit the insertion of a hose, nozzle or the like in the open end of the casing to fill and expand that portion of the casing which extends between the pinch rollers 6—6 and 10—10 with a body of fluid such as air or some other gas. By wrapping the open end of the casing about the nozzle and holding it tightly the operator can impose the desired pressure on the casing to expand the casing to the desired diameter as shown at 12. The operator then lowers the upper roller into contact with the tubing so as to pinch the tubing between the rollers and seal it against leakage of the fluid and withdraws the nozzle from the tubing. The casing is passed while expanded through a suitable drier housing 14 which may be supplied with a suitable heating medium, for example, hot air, through a conduit 16. The air may be suitably discharged from the housing 14 by the conduit 17 which returns the air for reheating or exhausts it to the atmosphere.

It is obvious that, with a given air pressure, the casing will be expanded to a greater diameter at the wet end where it enters the port 90 of the housing (Fig. 1) than at the dry end where it passes through the exit port 92. The air pressure is so adjusted that the diameter at the port 90 is at least equal to and preferably greater than the predetermined diameter to which the casing will be expanded during stuffing. As a result of the drying of the tubing as it passes through the chamber 14, the casing shrinks so that the diameter at the point 92 will be less than said predetermined diameter, and at some intermediate point, such as at point 12, the casing will be at exactly the predetermined diameter.

The predetermined diameter 12 to which the casing is expanded is ascertained by trial and is selected so that the casing, after drying and rewetting, will have a circumference smaller than the circumference to which it will be stuffed. The difference between the rewetted circumference and the circumference immediately after stuffing is made as small as possible, having regard for the wall thickness of the casing and the physical characteristics of the material from which it is formed, so as to require a minimum stuffing pressure and, at the same time, cause the elastic forces exerted by the casing during stuffing to be sufficient to hold the product within the casing in a compact, shapely mass which is free from bulges such as would occur if the casing did not exert any pressure on the stuffing material during and subsequent to stuffing. An expansion to a diameter from 5 to 40 per cent greater than the diameter after stuffing has been found to be satisfactory.

In view of the fact that the tubing is expanded as it passes between the rollers 6—6 and 10—10, it may be necessary to drive the pinch rollers 6—6 at a greater peripheral speed than the pinch rollers 10—10 are driven to compensate for the loss in length due to the increase in diameter. As the expanded tubing passes through the drier housing 14, the moisture will be evaporated, and as it comes from the drier, it will contain the desired amount of moisture for a so-called "dry" casing, which is usually between 4 and 12 per cent, depending to some extent on the climatic conditions under which the tubing is to be stored and further processed prior to stuffing.

As the dry tubing comes from between the pinch rollers 10—10, it is reeled for further treatment, such as printing, or is cut into sections of suitable length to form individual casings, for example, sausage casings, and is printed if desired. The printing may be done while the tubing is in a continuous length if desired but such casings are usually printed in shorter lengths.

The printing is done on any suitable type of press with an ink which adheres to the tubing in the presence of liquid moisture and also during cooking, curing and the like. Such inks are well known items of commerce and do not, within themselves, form a part of the present invention and for that reason will not be described in detail. Subsequent to printing the casings are suitably packaged and forwarded to stuffers, who then either wet the casing preparatory to stuffing it, or stuff it in the dry condition.

When the casings are to be wet prior to stuffing they are usually tied at one end and then soaked in water or some liquid which wets the casing material. The casings will then shrink when the stresses set in the casing by drying while in an expanded condition are relieved. The amount which the casing shrinks is determined by the magnitude of the diameter to which the casing was expanded in the drier, and the rewet diameter will be just sufficiently smaller than the diameter to which the casing is to be stuffed to enable the casing to exert the necessary pressure upon the material stuffed into the casing to hold the material firmly in position and prevent bulging and wrinkling of the casing.

The rewet casing is then slipped or shirred over the stuffing horn of a stuffing machine and is held tightly about the horn by one hand of the operator. The operator then starts the stuffing machine to fill the product into the casing. The product, such as sausage meat, is ejected from the machine under pressure and is forced into the casing to fill the same and expand the casing the small amount only which is necessary to insure that the casing closely conforms to the product introduced into the casing without wrinkles or bulges. When the end of the casing is reached, the operator stops the flow of the product from the stuffer and twists the casing to close the open end. While holding the twisted end of the casing, the operator then ties the open end or clips it in accordance with usual procedure to close the casing. The stuffed food product is then passed for further smoking and curing operations in accordance with well known practices.

The process of the present invention makes it possible to form large sized dried tubing for use as artificial sausage casings and the like which can be expanded with a minimum of effort and with a maximum of speed to produce stuffed products of excellent quality.

The small amount which it is necessary for the sausage meat to expand the casing in accordance with the present invention relieves the operator of the effort heretofore required to hold the casing against a high pressure. For example, while stuffing prior art casings it has frequently been necessary to expand the casing in excess of 40 percent. During stuffing of the casing of the present invention an expansion of 8 to 25 percent is all that is required to maintain the casing in tight contact with the casing filling at all times. This light expanding pressure is sufficient, however, to properly round out the filled casings and maintain them in the proper shape during curing and cooking.

Although this casing shrinks when rewet, all printing carried by the casing is formed of ink of the type previously described which is fully capable of contracting with the casing without becoming dislodged therefrom or being otherwise deleteriously affected. When the present casing is again expanded during stuffing the printing expands with the casing and again assumes its normal shape, free from distortion and dilution of color depth which occurs in prior art casings when the ink figures and configurations are expanded to a greater size than their normal size during stuffing. In contrast to such prior printed casings, the stuffed printed casing of the present invention has the appearance of having been printed after stuffing and the value of the finished product is thereby enhanced.

When the casing is stuffed while dry, one end of each of the dry casings as received by the stuffer is closed as by tying or clipping and the material to be filled into the casing is merely poured in from a suitable container or from a suitable spigot, nozzle or the like while at atmospheric pressure. When the dry casing is thus filled in the same manner as one would pour any product into an open bag or the like, the upper end is closed as by gathering the casing and tying it or clipping it, and the stuffed casing is set aside for a short period. During this period the moisture within the filling material wets the casing and causes it to shrink in the same manner that the casing shrank when rewet prior to stuffing. The shrinkage of the casing while stuffed causes the casing to compact the filling material and forces it into a compact, shapely mass which is of substantially uniform size throughout its area. The stuffed product is then passed for further treatment in accordance with well known practices.

It will be understood that any printing carried by the casing is distorted, if at all, only a very slight amount during the shrinking process since the casing is required to shrink only from 5 to 10 per cent in order to produce the compact article desired. This small amount of distortion is not noticeable to the eye and the shrinkage tends to increase the depth of color and/or opacity of the printing instead of diluting it. This is to be distinguished from the extreme dilution which normally took place when a casing was expanded as much as 40 per cent from the size that it had when printed by prior art practices. It can thus be seen that the stuffing process is greatly simplified by the use of this modification of the present invention to the extent where expensive stuffing equipment may be entirely dispensed with. The only facility required to stuff casings of the present invention while dry is some means for pouring the stuffing material into the casing. Simplification of the formerly relatively complicated stuffing process in this manner has increased the output capacity per operator, has reduced the skill required to be exercised by the operator and has entirely eliminated the expensive equipment required to produce stuffed products heretofore.

By way of explanation of the invention and not in limitation thereof, the following examples of operation in accordance with the process will be given:

*Example I*

A tubing, formed of denitrated cellulose nitrate in accordance with the disclosure of Patent No. 2,176,925 and plasticized with an aqueous solution of glycerine in any suitable manner and having a circumference of 10½ inches, was passed between the rollers 6—6 and 10—10 and inflated with air to expand it to a circumference of 16 inches, measured just within the entrance end of the drier housing 14. The temperature at the entrance end of the drier housing was 153° F. and at the exit end of the drier housing was 145° F. The circumference of the dried casing as it came from between the rollers 10—10 was 15¼ inches. The dried tubing was then cut into individual lengths substantially 20 inches long.

Prior to stuffing the casings formed as described above, they were soaked in water for approximately 15 minutes during which time they shrank to a circumference of 12¼ inches. While in the wet, shrunken condition, the casings were slipped or shirred over the horn of a well known type sausage stuffing machine and stuffed with sausage in the usual manner while expanding the casing to a circumference of 14½ inches, or an expansion of 18 per cent, by the use of a pressure of only ⅞ of a pound exerted on the sausage meat by the stuffing machine.

*Example II*

The tubing produced as previously described was cut into individual lengths but instead of being soaked in water each length of tubing was closed at one end and a wet mixture of sausage meat was poured into the casing to fill it to a point about three inches below the top, and the top was then gathered and tied in the usual manner. The moisture from the sausage meat mixture wet the casing and caused it to shrink into tight contact with and thereby shape the sausage meat filling. The sausage so stuffed was then passed for further cooking and curing treatments in accordance with usual practices.

If desired, the tubing as it enters the drier housing 14 may be subjected to a higher temperature than the remainder of the tubing by placing a suitable baffle wall within the housing chamber to divide the chamber into two parts and supplying a hotter fluid to the part through which the tubing first passes than to the remainder of the chamber. In this manner, the tubing is enabled to expand more readily and will expand to its fullest extent very rapidly. After leaving the hotter zone and passing into the cooler zone, the tubing will be drier and will contract to an appreciable extent even though the air pressure within the tubing at this time is the same as the air pressure within the tubing over the area of greater expansion.

Instead of expanding the tubing to the predetermined diameter and drying it simultaneously, the tubing may, if desired, be expanded previously and then dried while maintained in an inflated condition. An apparatus for carrying out this modification of the process is diagrammatically illustrated in Fig. 2. The wet tubing 8, produced as previously described, is passed between two pinch rollers 18—18 which are the same as or similar to the pinch rollers 6—6 illustrated in Fig. 1 and are provided with the same or similar types of pressure exerting apparatus to urge the pinch rolls 18—18 together and are also provided with a suitable separating mechanism. From the pinch rollers 18—18 the tubing is passed between a second pair of pinch rollers 20—20 which are substantially identical with pinch rollers 18—18. The pairs of pinch rollers 18—18 and 20—20 are positively driven from any desired prime mover but preferably are driven through a suitable change-speed mechanism so as to drive the rollers 18—18 at a different peripheral speed from the rollers 20—20 if desired. For example, it will usually be necessary to drive the rollers 18—18 at a greater peripheral speed, for example 5 to 15 per cent faster than the rollers 20—20 to compensate for the shortening of the tubing between the two sets of rollers due to the expansion of the tubing which takes place between the rollers. The tubing 8 is expanded between the rollers 18—18 and 20—20 to a diameter predetermined as previously described as shown at 22 by means of a suitable fluid pressure exerted by a fluid introduced into the tubing between the two sets of rollers in the same manner that the fluid was introduced into the tubing 8 in the apparatus illustrated in Fig. 1. The fluid introduced into the tubing to produce the expansion illustrated at 22 may be a liquid such as water or the like, or may be a gas such as air.

As the tubing 8 leaves the pinch rollers 20—20 it is passed for a suitable distance, for example 10 to 150 feet, and is then passed between a third pair of positively driven pinch rollers 24—24 which may be identical with pinch rollers 20—20. A suitable gas is introduced into the tubing between the pinch rollers 20—20 and 24—24 in the same manner as previously explained to expand the tubing as shown at 26. The diameter 26 will usually be made sufficiently smaller than the predetermined diameter 22 of the expanded tubing to produce a dry casing which will swell or expand slightly when placed in a suitable wetting liquid prior to stuffing. The diameter 26 of the tubing during drying may be varied as desired, however, so as to produce a casing which shrinks in water.

A housing 28 is disposed around the tubing between the rollers 20—20 and 24—24 and is supplied with a suitable heated drying fluid such as hot air through a conduit 30. The drying fluid is exhausted to the atmosphere or returned for reheating by a suitable conduit 32. The housing 28 may extend over and include as much of the tubing between the rollers 18—18 and 20—20 as desired or may be restricted to that portion of the expanded tubing between the rollers 20—20 and 24—24.

When the dry tubing leaves the rollers 24—24, it may be reeled, cut, printed and otherwise treated in the same manner as previously described and the finished casing may be stuffed as previously described.

When tubing is dried while maintained in an expanded and therefore stretched condition the stresses set up in the dry tubing may be prematurely relieved and cause the tubing to undergo some distortion during storage or transportation due to an unusual increase in the amount of moisture contained in the air. This condition can be controlled and substantially eliminated by properly controlling the amount of plasticizer absorbed by the tubing. For example, when tubing is to be used in a very damp climate the amount of plasticizer applied should be materially reduced so as to prevent the tubing from regaining a substantial amount of moisture from the atmosphere and thereby becoming distorted.

The tubing may also be prevented from shrinking and thereby becoming distorted by maintaining it in a conditioned atmosphere in which the humidity is maintained sufficiently low to prevent regain of moisture by the tubing.

Another way of overcoming distortion due to the gaining of moisture from the atmosphere is to humidify the tubing and permit it to shrink during the drying process. An apparatus capable of carrying out this modification of the process of the present invention is illustrated in Fig. 3, wherein the three pairs of pinch rollers 58—58, 60—60 and 62—62 may be identical with or substantially similar to the pinch rollers previously described. The tubing 8, formed as previously described, is passed between the pinch rollers 58—58 and is then passed between a second pair of pinch rollers 60—60 which may be spaced any desired distance, for example from 10 to 150 feet from the pinch rollers 58—58. Between these pairs of pinch rollers the tubing is expanded by a suitable gaseous fluid to a predetermined diameter 64 as previously described, and in the same manner.

From the pinch rollers 60—60 the tubing is passed between a third pair of pinch rollers 62—62 which may be located at any desired distance for example, 10 to 50 feet from the pinch rollers 60—60. A housing 66 is positioned around the casing between the pinch rollers 58—58 and 62—62. The housing is divided into three chambers, 68, 70 and 72 by means of two baffle walls 74 and 76. The chamber 68 is supplied with a suitable heating fluid for example hot air, by means of a conduit 78 and the heating fluid is exhausted from the housing 66 by a suitable conduit 80. The majority of the moisture in the wet tubing 8 is removed while it is expanded as illustrated at 64 by the heating fluid within the chamber 68.

As the tubing passes through the chamber 70, it is partially rehumidified by means of a vapor, for example steam, passed into the chamber 70 by a conduit 82 and exhausted therefrom by means of a conduit 84. The tubing between the pinch rollers 60—60 and 62—62 is expanded by a suitable gas such as air under a lower pressure than the gas which expanded the tubing between the pinch rollers 58—58 and 60—60. This enables the tubing to contract within the chamber 70 as it is rehumidified so as to relieve the stresses set up in the tubing by drying while expanded in the chamber 68.

From the chamber 70 the expanded tubing passes into a chamber 72 where it is again dried by means of a dry heated fluid, for example dry hot air is passed into the chamber 72 by a conduit 86 and exhausted from the chamber 72 by a conduit 88. The tubing is thereby dried in the chamber 72 to the desired moisture content.

The dried tubing passing from between the pinch rollers 62—62 may be cut, printed and otherwise treated as previously described. The tubing so formed is stuffed by rewetting and stuffing while expanding the tubing the small amount only required to expand it from the rewet size to the stuffed size, all as previously explained.

If desired, the tubing expanded by the use of the apparatus illustrated in Fig. 3 may be printed before being rehumidified so that the tubing will be printed at a time when it is of a size close to the final stuffed size and thereby avoid all distortion. The printed tubing may then be rehumidified and dried while expanded. Even when the tubing is not printed until after it leaves the pinch rollers 62—62, the amount of distortion of the printing is held at a minimum since the dry size of the tubing produced in this manner is not greatly different from the restuffed size. That is, the amount of distortion which the printing undergoes while expanding from the dried size to the stuffed size is not sufficient to be noticeable to an undesirable extent.

One of the oustanding contributions to the art offered by the casing of the present invention is the freedom of the casing from failures during stuffing. In this invention the casings are preferably expanded in the wet state well beyond the diameter to which they will be later expanded during stuffing. Any weaknesses, pin-holes or other defects within the casing will thereby be detected during the expanding operation and any breaks will occur at that time, thus insuring that all casings which successfully pass the present pre-stretching operations without failure will withstand the low stuffing pressure encountered unless they are damaged subsequently to testing. The pretested casing of the present invention reduces the waste of the food product which formerly occurred due to the casing failures.

The casing may be expanded and otherwise treated in accordance with the present invention while traveling in a vertical direction or at any desired angle to the vertical if desired. The tubing has been illustrated as traveling in a horizontal direction merely for the sake of convenience.

The casing of the present invention expands the small amount required during stuffing under a low pressure and for this reason, the casing wall near the ends of the casing expands abruptly from the tied portion instead of gradually, as was the case heretofore, and in this manner forms a square ended stuffed product which is much desired by merchants and customers. The casing of the present invention also simplifies stuffing operations to a point where a relatively unskilled operator may be used, which of course, further reduces the expense of producing stuffed food products. Also, the square end of the stuffed food product reduces loss during slicing because the size of the butt end frequently cut off and discarded is reduced. Furthermore, the preexpanded casing of the present invention has a relatively thin wall which causes the casing to be soft and thereby capable of being tied rapidly and neatly.

The expression "pre-expanded casing" or "pre-expanded tubing" as used in the appended claims is intended to designate a casing or tubing which has been expanded after denitration or regeneration and while in a wet state to a diameter at least equal to or greater than the diameter to which the casing will be expanded during stuffing.

The casing of the invention may be used for all varieties of stuffed products and while particular reference has been made to its use as a casing for sausage, it may also be stuffed with other food products such as ham butts, boned meat, fowl, cheese, ice cream and the like, and with products which are not foods such, for example, as lubricating grease, snuff, and paste of all kinds.

This application is a division of my copending application Serial No. 399,560 filed June 24, 1941, now Patent 2,401,798, June 11, 1946.

Since certain changes in carrying out the above process and certain modifications in the article which embodies the invention may be made without departing from its scope, it is intended that all matter contained in the above description or shown in the accompanying drawing shall be interpreted as illustrative and not in a limiting sense.

Having described my invention what I claim as new and desire to secure by Letters Patent is:

1. In an apparatus for forming casings for a stuffed encased product having a predetermined diameter, the combination of an elongate drying chamber having a port of entry of greater diameter than a port of exit, a pair of pinch rolls positioned outside of and adjacent one end of said chamber, a second pair of pinch rolls positioned outside of and adjacent the other end of said chamber, and a third pair of pinch rolls positioned inside the chamber intermediate the aforesaid rolls, all of said rolls providing means for sealing and conveying a section of endless tubing passing between said rolls and through said chamber.

2. In an apparatus for forming casings for a stuffed encased product having a predetermined diameter, the combination of an elongate drying chamber, a pair of pinch rolls positioned outside of and adjacent one end of said chamber, a second pair of pinch rolls positioned outside of and adjacent the other end of said chamber and a third pair of pinch rolls positioned inside the chamber intermediate the aforesaid rolls, and baffles disposed adjacent said inside rolls so as to divide the interior of the chamber into different drying sections, all of said rolls providing means for sealing and conveying a section of an endless tubing passed between said rolls and through said chamber.

3. In an apparatus for forming casings for a stuffed encased product having a predetermined diameter, the combination of an elongate drying chamber having a port of entry of greater diameter than a port of exit, a pair of pinch rolls positioned outside of and adjacent one end of said chamber, a second pair of pinch rolls positioned outside of and adjacent the other end of said chamber and a third pair of pinch rolls positioned inside the chamber intermediate the aforesaid rolls, and baffles in said chamber positioned to divide the space between the third and second mentioned pair of rolls into two different drying sections, all of said rolls providing means for sealing and conveying a section of an endless tubing passing between said rolls and through said chamber, and means for heating said sections to different temperatures and means for controlling the humidity in said sections.

FRANK H. REICHEL.

REFERENCES CITED

The following references are of record in the file of this patent:

UNITED STATES PATENTS

| Number | Name | Date |
| --- | --- | --- |
| 1,612,509 | Henderson | Dec. 28, 1926 |
| 2,016,841 | Smith | Oct. 8, 1935 |
| 2,136,566 | Schnecko et al. | Nov. 15, 1938 |
| 2,337,927 | Reichel et al. | Dec. 28, 1943 |